(12) United States Patent
McCallum et al.

(10) Patent No.: US 9,734,273 B2
(45) Date of Patent: Aug. 15, 2017

(54) SYSTEM DESIGN MANAGEMENT

(71) Applicant: Mentor Graphics Corporation, Wilsonville, OR (US)

(72) Inventors: Darcy McCallum, Wilsonville, OR (US); Bill Chown, Beaverton, OR (US); Eric Thompson, Portland, OR (US)

(73) Assignee: Mentor Graphics Corporation, Wilsonville, OR (US)

(*) Notice: Subject to any disclaimer, the term of this patent is extended or adjusted under 35 U.S.C. 154(b) by 196 days.

(21) Appl. No.: 14/567,495

(22) Filed: Dec. 11, 2014

(65) Prior Publication Data

US 2015/0347656 A1  Dec. 3, 2015

Related U.S. Application Data

(60) Provisional application No. 62/003,275, filed on May 27, 2014.

(51) Int. Cl.
  *G06F 17/50*  (2006.01)
(52) U.S. Cl.
  CPC .......... *G06F 17/5068* (2013.01); *G06F 17/50* (2013.01); *G06F 17/5081* (2013.01); *G06F 2217/02* (2013.01); *G06F 2217/04* (2013.01); *G06F 2217/06* (2013.01); *G06F 2217/08* (2013.01); *G06F 2217/10* (2013.01)
(58) Field of Classification Search
  None
  See application file for complete search history.

(56) References Cited

U.S. PATENT DOCUMENTS

| | | | | |
|---|---|---|---|---|
| 5,983,277 A * | 11/1999 | Heile | ............... | G01R 31/3177 709/215 |
| 6,035,297 A * | 3/2000 | Van Huben | ....... | G06F 17/30557 707/695 |
| 6,080,204 A * | 6/2000 | Mendel | ............... | G06F 17/5054 716/103 |
| 6,321,369 B1 * | 11/2001 | Heile | ............... | G01R 31/3177 716/102 |
| 6,915,252 B1 * | 7/2005 | Li | ............... | G06F 17/50 703/1 |
| 7,039,892 B2 * | 5/2006 | Mantey | ............... | G06F 17/5077 716/102 |
| 7,143,341 B1 * | 11/2006 | Kohli | ............... | G06F 17/50 715/234 |
| 7,523,433 B1 * | 4/2009 | Anderson | ............ | G06F 11/323 707/999.003 |
| 7,546,571 B2 * | 6/2009 | Mankin | ............... | G06F 17/5045 700/103 |

(Continued)

*Primary Examiner* — Leigh Garbowski
(74) *Attorney, Agent, or Firm* — Mentor Graphics Corporation

(57) ABSTRACT

This application discloses a computing system implementing tools and mechanisms to generate a framework for a system-level design of an electronic system, wherein the system-level design includes multiple electronic designs from different electronic design automation tools. The tools and mechanisms can correlate design components in the electronic designs to different portions of the framework for the system-level design, and determine whether the electronic designs are congruent with the system-level design based, at least in part, on the correlation of the electronic designs to the different portions of the framework for the system-level design.

17 Claims, 11 Drawing Sheets

(56) References Cited

U.S. PATENT DOCUMENTS

| | | | | |
|---|---|---|---|---|
| 7,661,101 B2* | 2/2010 | Chadzynski | G06F 9/541 | |
| | | | 717/164 | |
| 7,797,381 B2* | 9/2010 | Zhang | G06Q 30/06 | |
| | | | 705/1.1 | |
| 7,971,178 B1* | 6/2011 | Marwah | G06F 17/5068 | |
| | | | 716/100 | |
| 8,316,342 B1* | 11/2012 | Kukal | G06F 17/5045 | |
| | | | 703/13 | |
| 8,326,926 B2* | 12/2012 | Sangem | G06F 17/5068 | |
| | | | 709/204 | |
| 8,364,656 B2* | 1/2013 | Arora | G06F 17/3048 | |
| | | | 707/704 | |
| 8,438,524 B1* | 5/2013 | Kohli | G06F 17/5068 | |
| | | | 716/120 | |
| 8,453,136 B1* | 5/2013 | Hahn | G06F 8/355 | |
| | | | 716/100 | |
| 8,516,399 B2* | 8/2013 | Paris | G06F 17/5081 | |
| | | | 716/136 | |
| 8,521,483 B1* | 8/2013 | Kukal | G06F 17/5022 | |
| | | | 703/19 | |
| 8,560,109 B1* | 10/2013 | Parr | G05B 15/00 | |
| | | | 345/420 | |
| 8,572,548 B2* | 10/2013 | Tung | G06Q 10/06 | |
| | | | 717/101 | |
| 8,694,953 B2* | 4/2014 | Khodabandehloo | G06F 8/20 | |
| | | | 715/717 | |
| 8,818,769 B2* | 8/2014 | Trainer | G06F 17/50 | |
| | | | 703/1 | |
| 8,843,865 B2* | 9/2014 | Tai | G06F 17/5068 | |
| | | | 716/110 | |
| 8,892,404 B2* | 11/2014 | Potter | G06F 17/50 | |
| | | | 703/1 | |
| 9,026,984 B2* | 5/2015 | Tung | G06Q 10/06 | |
| | | | 717/101 | |
| 9,047,435 B2* | 6/2015 | Satou | G06F 17/5068 | |
| 9,317,640 B2* | 4/2016 | Belville | G06F 17/5045 | |
| 2002/0184246 A1* | 12/2002 | Shkolnik | G06Q 10/10 | |
| 2006/0101368 A1* | 5/2006 | Kesarwani | G06F 17/5045 | |
| | | | 716/137 | |
| 2012/0110595 A1* | 5/2012 | Reitman | G06F 17/50 | |
| | | | 719/313 | |

\* cited by examiner

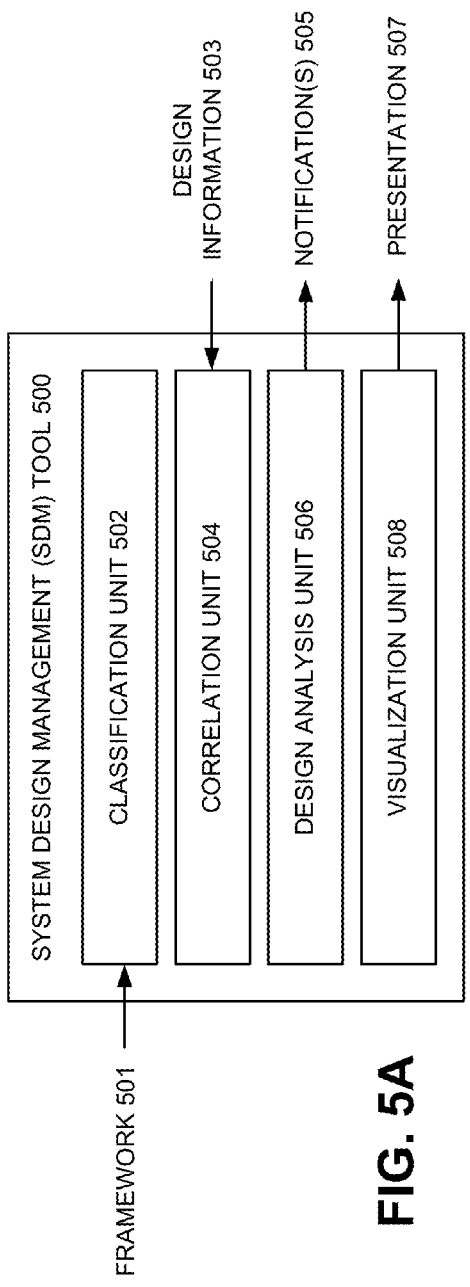
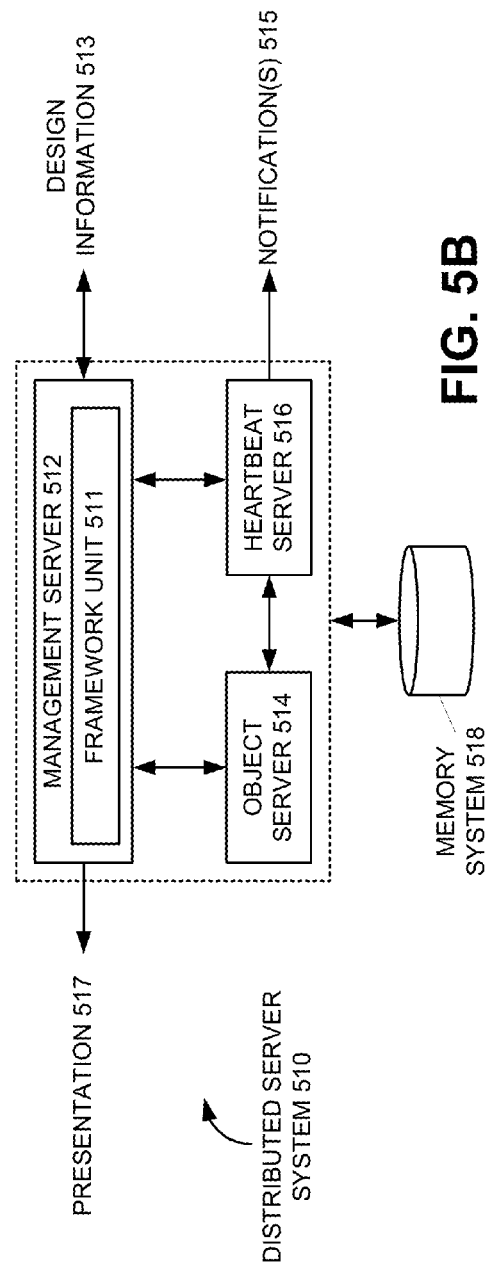
FIG. 5A
FIG. 5B

SYSTEM DESIGN MANAGEMENT

RELATED APPLICATIONS

This application claims priority to U.S. Provisional Patent Application No. 62/003,275, filed May 27, 2014, which is incorporated by reference herein.

TECHNICAL FIELD

This application is generally related to electronic design automation and, more specifically, to system design management.

BACKGROUND

Electronic design automation (EDA) tools can allow users to design and analyze electronic devices or systems. These electronic design automation tools are typically tailored to perform a specific design task or set of design tasks, such as generate system level requirements, develop system architectures, perform electronic or network design, or the like. In developing an electronic system, engineering teams often employ multiple different electronic design automation tools, many times in tandem, to separately develop portions of the electronic system and then subsequently attempt to integrate them into a final electronic system design. While this development strategy can ultimately allow the engineering team to build the electronic system, the integration of the separately developed portions of the electronic system is difficult and usually leads to iterative re-design.

The difficulty with integrating the separately developed portions of the electronic system typically stems from the fact that the multiple different electronic design automation tools are typically developed as stand-alone tools, which are often not integrated during the design process. Thus, a design choice or alteration to a design made in one electronic design automation tool can have ripple effects to other portions of the electronic system design, which often are not be realized until there was an attempt to integrate the separately developed portions of the electronic system design. In an attempt to reduce a number of re-designs during the integration stage of the design process, some system design teams have attempted to perform an ad hoc characterization of the different design features as a design is being built or after integration has failed. These ad hoc characterization schemes typically include building a tool interface architecture in an attempt to enable all of the stand-alone electronic design automation tools to directly communicate their design characterizations with each other. Unfortunately, since many of the electronic design automation tools were designed for a particular purpose, which did not include interfacing with other electronic design automation tools, this direct tool interface becomes riddled with inconsistency.

SUMMARY

This application discloses a computing system implementing tools and mechanisms to generate a framework for a system-level design of an electronic system, wherein the system-level design includes multiple electronic designs from different electronic design automation tools. The tools and mechanisms can correlate design components in the electronic designs to different portions of the framework for the system-level design, and determine whether the electronic designs are congruent with the system-level design based, at least in part, on the correlation of the electronic designs to the different portions of the framework for the system-level design.

DESCRIPTION OF THE DRAWINGS

FIGS. 5A and 5B illustrate an example implementations of system design management according to various embodiments of the invention.

DETAILED DESCRIPTION

System Design Management (SDM) Environment

Figure 1:
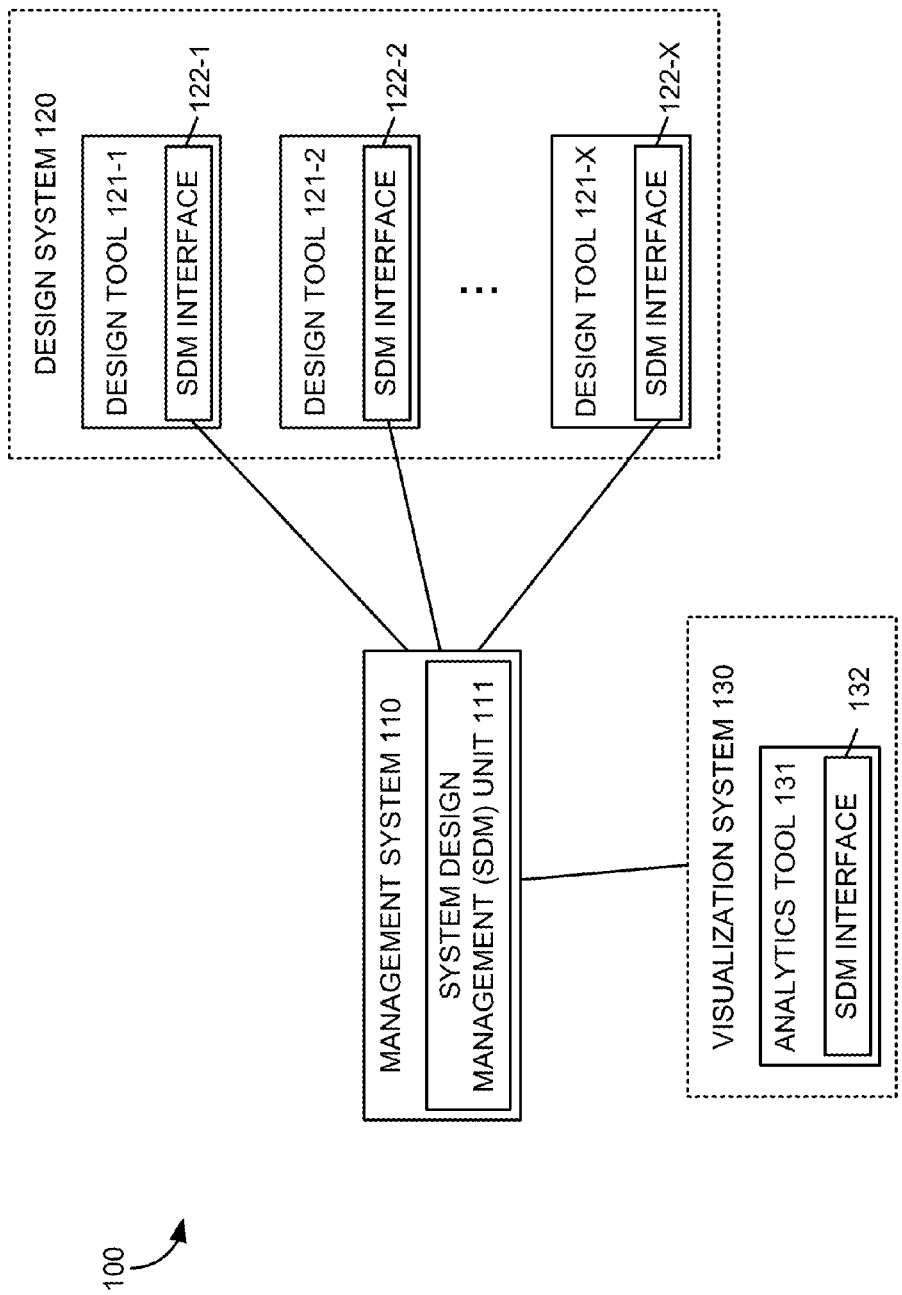
FIG. 1 illustrates an example of a system design management environment according to various embodiments of the invention.
Figure 6:
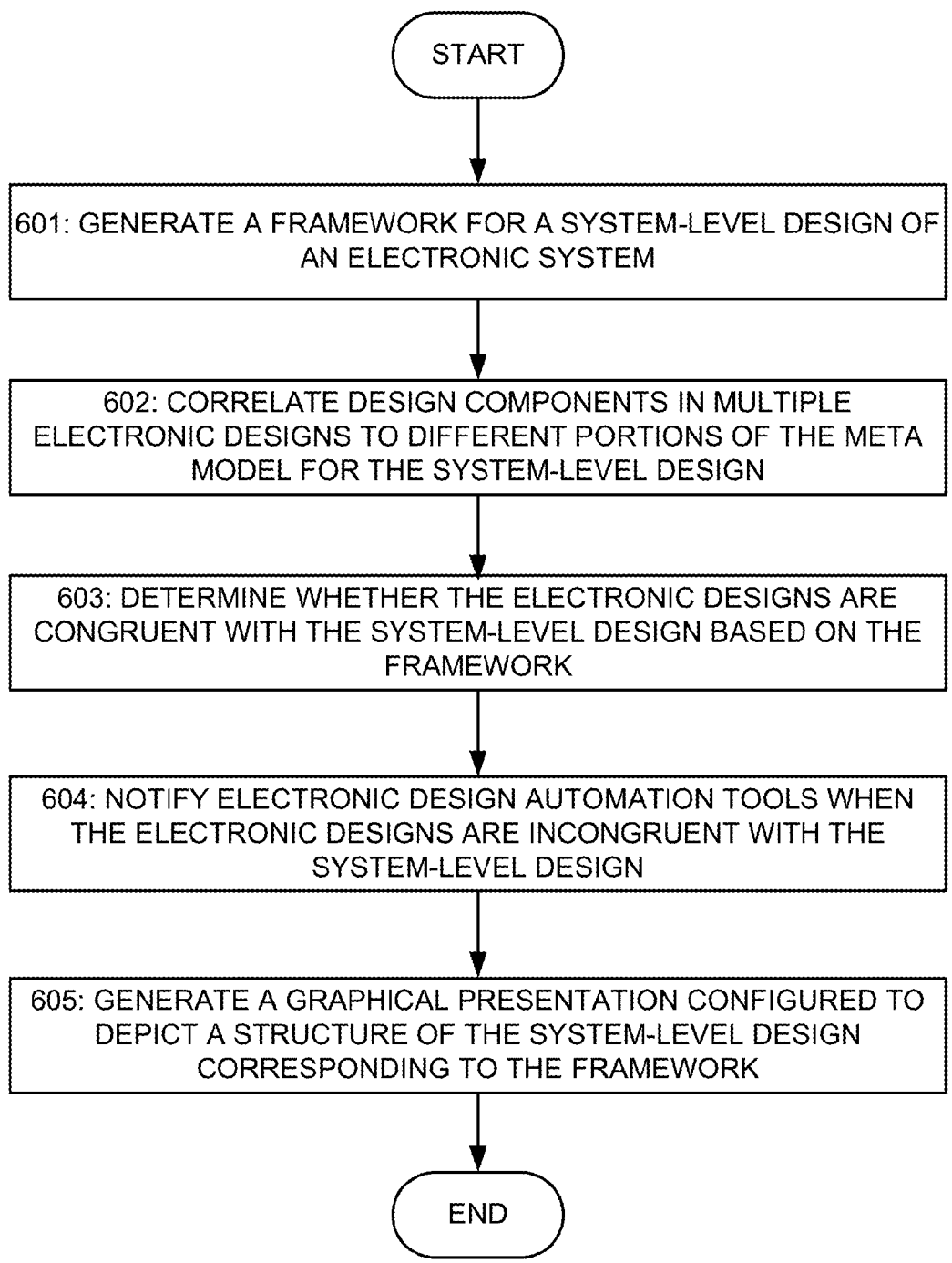
FIG. 6 illustrates an example flowchart for system design management according to various embodiments of the invention.

FIG. 1 illustrates an example of a system design management environment 100 according to various embodiments of the invention and FIG. 6 illustrates an example flowchart for system design management according to various embodiments of the invention. Referring to FIGS. 1 and 6, the system design management environment 100 includes a design system 120 having multiple design tools 121-1 to 121-X capable of generating or analyzing designs for different portions or aspects of an electronic system, or controlling development of the designs for the electronic system. Some of the designs for the different portions or aspects of the electronic system can be represented at different levels of abstraction relative to each other. For example, the design tools 121-1 to 121-X can generate system level requirements for the electronic system, develop functional designs for one or more portions of the electronic system, generate designs for a system architecture or specific electronic components or subsystems in the system, perform verification on any of the designs developed in the design system 120, or the like. Depending on the specifications for the electronic system, various combinations of different design tools can be utilized to generate designs of the electronic system.

The system design management environment 100 includes a management system 110 to manage or integrate the designs generated by the design system 120, for example, utilizing a framework of a system-level design for the electronic system. The framework of the system-level design, in some embodiments, can describe the electronic system by specifying various features and/or characteristics of the electronic system. For example, the framework of the system-level design can describe the electronic system as a collection of objects, which can be assigned attributes that identify the various features or characteristics associated with the objects. The framework also can include various actions to be performed in response to specified conditions associated with data correlated or linked to objects in the framework. The framework also can utilize the objects to characterize development processes for the electronic system, for example, implement project management functionality, manage user access, permissions, priorities, and administrative review, or the like, which will be described below in greater detail.

The management system 110 can generate the framework for the system-level design of the electronic system as shown in block 601 in FIG. 6. The management system 110 can include a system design management (SDM) unit 111 that, in some embodiments, can enable development of the framework for the system-level design. For example, the management system 110 can generate at least a portion of the framework for the system-level design in response to input from a user interface. The system design management unit 111 also can receive the framework for the system-level design from a device or system external to the system design management unit 111.

The management system 110 can correlate design components in the electronic designs to different portions of the framework for the system-level design, as shown in block 602. For example, the system design management unit 111 can correlate the designs (or portions thereof) developed by the design system 120 to the framework for the system-level design. In some embodiments, the system design management unit 111 can correlate the designs to the framework by associating or linking data from the designs to different objects or attributes in the framework. For example, when the framework includes an object corresponding to external reset functionality, the system design management unit 111 can associate a portion of at least one of the designs, such as a reset pin or port and/or reset circuitry, to the object in the framework. This association of design data to objects in the framework can correspond to the correlation of the designs (or portions thereof) developed by the design system 120 to the framework for the system-level design.

The system design management unit 111 can correlate the designs (or portions thereof) to the framework for the system-level design in multiple different ways. For example, the system design management unit 111, in some embodiments, can communicate the framework of the system-level design or a portion thereof to one or more of the design tools 121-1 to 121-X in the design system 120, which can allow the design tools 121-1 to 121-X in the design system 120 to associate portions of the design they have developed or are in the process of developing to the framework received from the management system 110. The design tools 121-1 to 121-X can then communicate the associated portions to the system design management unit 111, where the system design management unit 111 utilizes the associated portions to correlate the designs to the framework for the system-level design. In some embodiments, the system design management unit 111 can receive at least a portion of designs from the design tools 121-1 to 121-X and correlate the received portions of the designs to the framework for the system-level design, for example, based on which of the design tools 121-1 to 121-X sent the portion of the design, the content of the portion of the design, or the like.

The management system 110 can determine whether the electronic designs are congruent with the system-level design, as shown in block 603. For example, the system design management unit 111 can utilize the correlation of the designs to the framework for the system-level design to determine whether the electronic designs are congruent with the system-level design. The system design management unit 111, in some embodiments, can utilize the structure of the framework, such as the object and attributes, and any design information provided to the management system 110 from the design system 120 to identify whether an individual design conforms with the system-level design, whether multiple different designs are congruent with each other, or the like.

Since system design management unit 111 correlates portions of the designs from the design system 120 to the framework, the system design management unit 111 can analyze the correlated portions of the designs to determine whether the data in the correlated portions of the designs conform to data expected by the framework. For example, when the framework includes an object correlated to an input/output (I/O) interface in one of the designs, the system design management unit 111 can utilize the attributes of the object to determine whether the design for the I/O interface performs certain functions, operates within certain electrical specifications, or the like. The system design management unit 111 also can utilize the object to identify related objects, such as circuitry from a different design intended to couple or connect to the I/O interface, and utilize the attributes of both objects to determine whether there is congruency between the two designs and/or congruency with the system-level design described in the framework.

The management system 110 can notify one or more of the electronic design automation tools when the electronic designs are incongruent with the system-level design of the electronic system, as shown in block 604. In some embodiments, each of the design tools 121-1 to 121-X can include a corresponding system design management (SDM) interface 122-1 to 122-X, which can communicate with the management system 110. These system design management interfaces 122-1 to 122-X, in some embodiments, can be written into or otherwise integrated with their corresponding design tools 121-1 to 121-X. The system design management interfaces 122-1 to 122-X can be utilized to communicate with the system design management unit 111, for example, to exchange portions designs, portions of the framework for the system-level design, provide information corresponding to the congruency of a design to other designs being developed by the design system 120, provide information corresponding to the congruency of a design to the framework for the system-level design, to exchange project management information, or the like.

The system design management environment 100 includes a visualization system 130 to analyze information form the management system 110 and present graphical views of the analyzed information. The visualization system 130 can generate a graphical presentation configured to depict a structure of the system-level design corresponding to the framework, as shown in block 605. For example, the visualization system 130 can include an analytics tool 131 having a system design management (SDM) interface 132, which can communicate with the management system 110. The system design management interface 132, in some embodiments, can be written into or otherwise integrated with the analytics tool 131. The system design management interface 132 can be utilized to communicate with the system design management unit 111, for example, to receive at least a portion of the framework for the system-level design from the system design management unit 111, receive updates in design data correlated to a specific portion of the framework from the system design management unit 111, receive project management information from the system design management unit 111, or the like.

The analytics tool 131 can analyze and present the information received from the system design management unit 111, for example, in one or more graphical views or presentations. In some embodiments, the analysis of the information can include identifying objects in the framework, identifying relationships between the objects, determining which objects have correlated design data, or the like.

The analytics tool 131 can build one or more graphical view of the framework and correlated design data, which can illustrate the system-level design of the electronic system based on the framework and correlated design data. There are many different ways to organize the objects in the graphical views, such as by relationships to other objects, by shared attributes among sets or sub-sets of object, by scheduling dependence based on project management work flow, by a total amount of interrelationship to other objects, of the like. In some embodiments, the analytics tool 131 can annotate the one or more graphical views with various attributes associated with those objects, including whether design data has been correlated with the objects, types of design data utilized, a status of design work associated with the object, or the like. Embodiments of different types of graphical views will be described below in greater detail.

Illustrative Operating Environment

Figure 2:
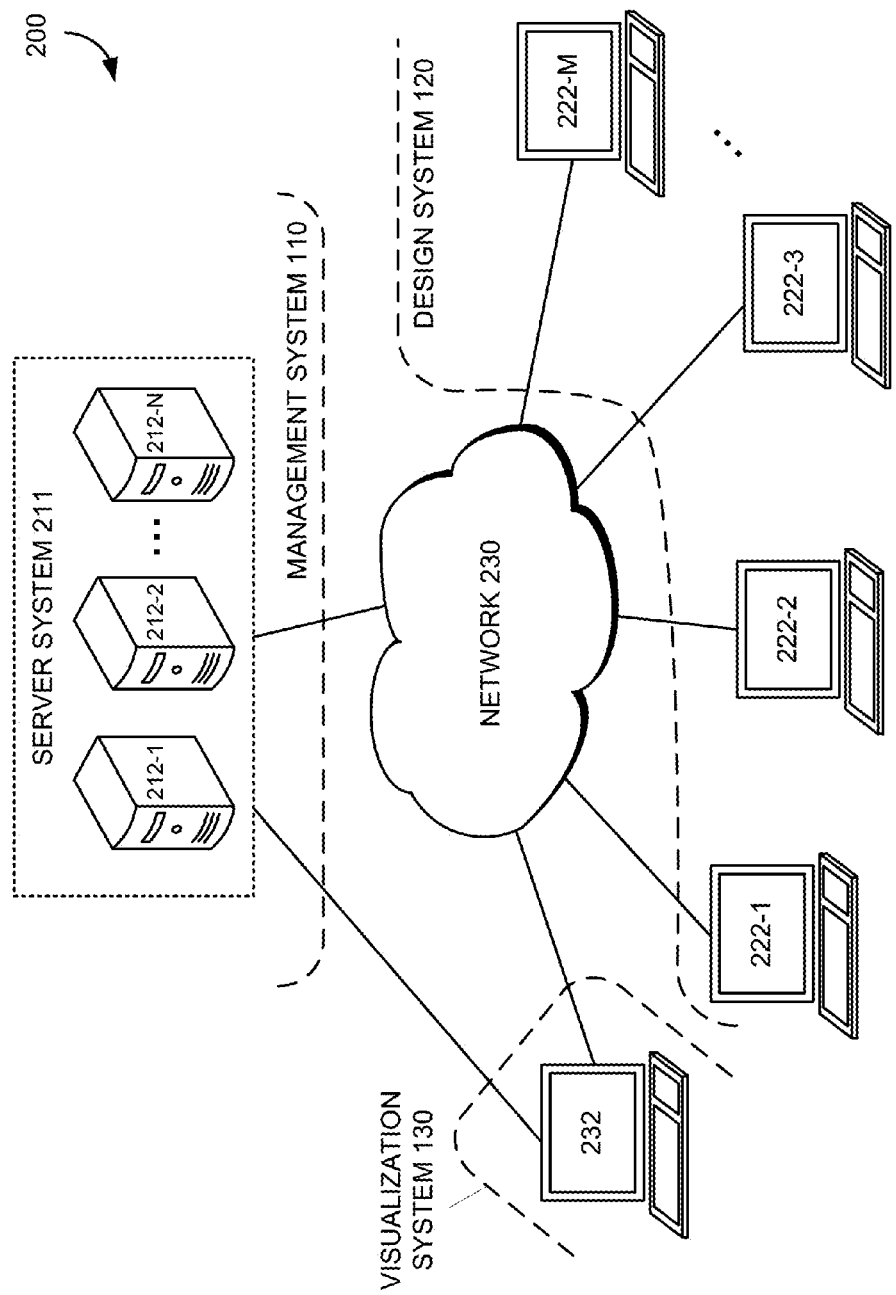
FIG. 2 illustrates an example system implementing a distributed system design management environment according to various embodiments of the invention.

FIG. 2 illustrates an example system 200 implementing a distributed system design management environment according to various embodiments of the invention. Referring to FIG. 2, the system 200 includes a server-side, for example, a management system 110, and a client-side, for example, a design system 120 and a visualization system 130, which can communicate with each other over a network 230. The server-side can include the server system 211 to implement the system design management environment for the client-side of the system 200. In some embodiments, the server system 211 can include multiple servers 212-1 to 212-N or other processing devices capable of implementing the distributed system design management environment for the design system 120 and the visualization system 130.

The client-side, for example, a design system 120 and a visualization system 130, can include multiple client devices 222-1 to 222-M, which can communicate with the server system 211 directly or through a network 230. In some embodiments, each of the client devices 222-1 to 222-M can implement at least one electronic design automation tool and include a system design management interface (not shown) to communicate with the server system 211. The client devices 222-1 to 222-M can be computers, laptops, workstations, tablets, handsets, or other processing devices capable of communicating with the context server system 211 directly or over the network 230. The network 230 can include one or more packet-switched networks, one or more circuit-switched networks, a combination of both, or the like, which can exchange communication between the server-side and the client-side over wired, wireless, cellular, or any other transmission medium. Embodiments of the system design management environment will be described below in greater detail.

The execution of various electronic design automation processes, such as in client devices 222-1 to 222-M, or the management and integration of those processes, such as in server system 211, according to embodiments of the invention may be implemented using computer-executable software instructions executed by one or more programmable computing devices. Because these embodiments of the invention may be implemented using software instructions, the components and operation of a programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads.

Figure 3:
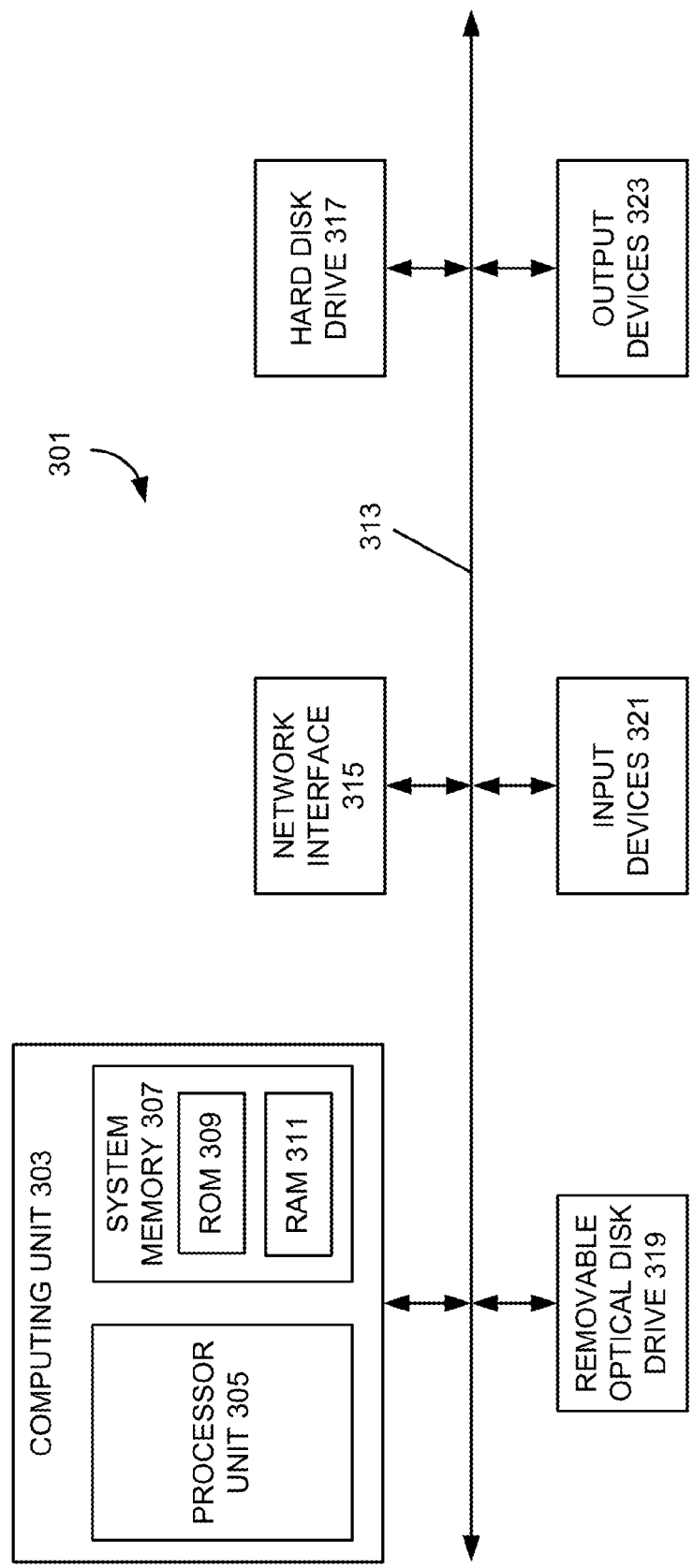
FIGS. 3 and 4 illustrate an example of a computer system of the type that may be used to implement various embodiments of the system design management environment.

Various examples of the invention may be implemented through the execution of software instructions by a computing device, such as a programmable computer. Accordingly, FIG. 3 shows an illustrative example of a computing device 301. As seen in this figure, the computing device 301 includes a computing unit 303 with a processing unit 305 and a system memory 307. The processing unit 305 may be any type of programmable electronic device for executing software instructions, but will conventionally be a microprocessor. The system memory 307 may include both a read-only memory (ROM) 309 and a random access memory (RAM) 311. As will be appreciated by those of ordinary skill in the art, both the read-only memory (ROM) 309 and the random access memory (RAM) 311 may store software instructions for execution by the processing unit 305.

The processor unit 305 and the system memory 307 are connected, either directly or indirectly, through a bus 313 or alternate communication structure, to one or more peripheral devices. For example, the processor unit 305 or the system memory 307 may be directly or indirectly connected to one or more additional memory storage devices, such as a "hard" disk drive 317, a removable magnetic disk drive, an optical disk drive 319, or a flash memory card 321. The processor unit 305 and the system memory 307 also may be directly or indirectly connected to one or more input devices 321 and one or more output devices 323. The input devices 321 may include, for example, a keyboard, a pointing device (such as a mouse, touchpad, stylus, trackball, or joystick), a scanner, a camera, and a microphone. The output devices 323 may include, for example, a monitor display, a printer and speakers. With various examples of the computer 301, one or more of the peripheral devices 315-325 may be internally housed with the computing unit 303. Alternately, one or more of the peripheral devices 315-325 may be external to the housing for the computing unit 303 and connected to the bus 313 through, for example, a Universal Serial Bus (USB) connection.

With some implementations, the computing unit 303 may be directly or indirectly connected to one or more network interfaces 315 for communicating with other devices making up a network. The network interface 315 translates data and control signals from the computing unit 303 into network messages according to one or more communication protocols, such as the transmission control protocol (TCP) and the Internet protocol (IP). Also, the interface 315 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 301 is illustrated as an example only, and it not intended to be limiting. Various embodiments of the invention may be implemented using one or more computing devices that include the components of the computer 301 illustrated in FIG. 3, which include only a subset of the components illustrated in FIG. 3, or which include an alternate combination of components, including components that are not shown in FIG. 3. For example, various embodiments of the invention may be implemented using a multi-processor computer, a plurality of single and/or multiprocessor computers arranged into a network, or some combination of both.

Figure 4:
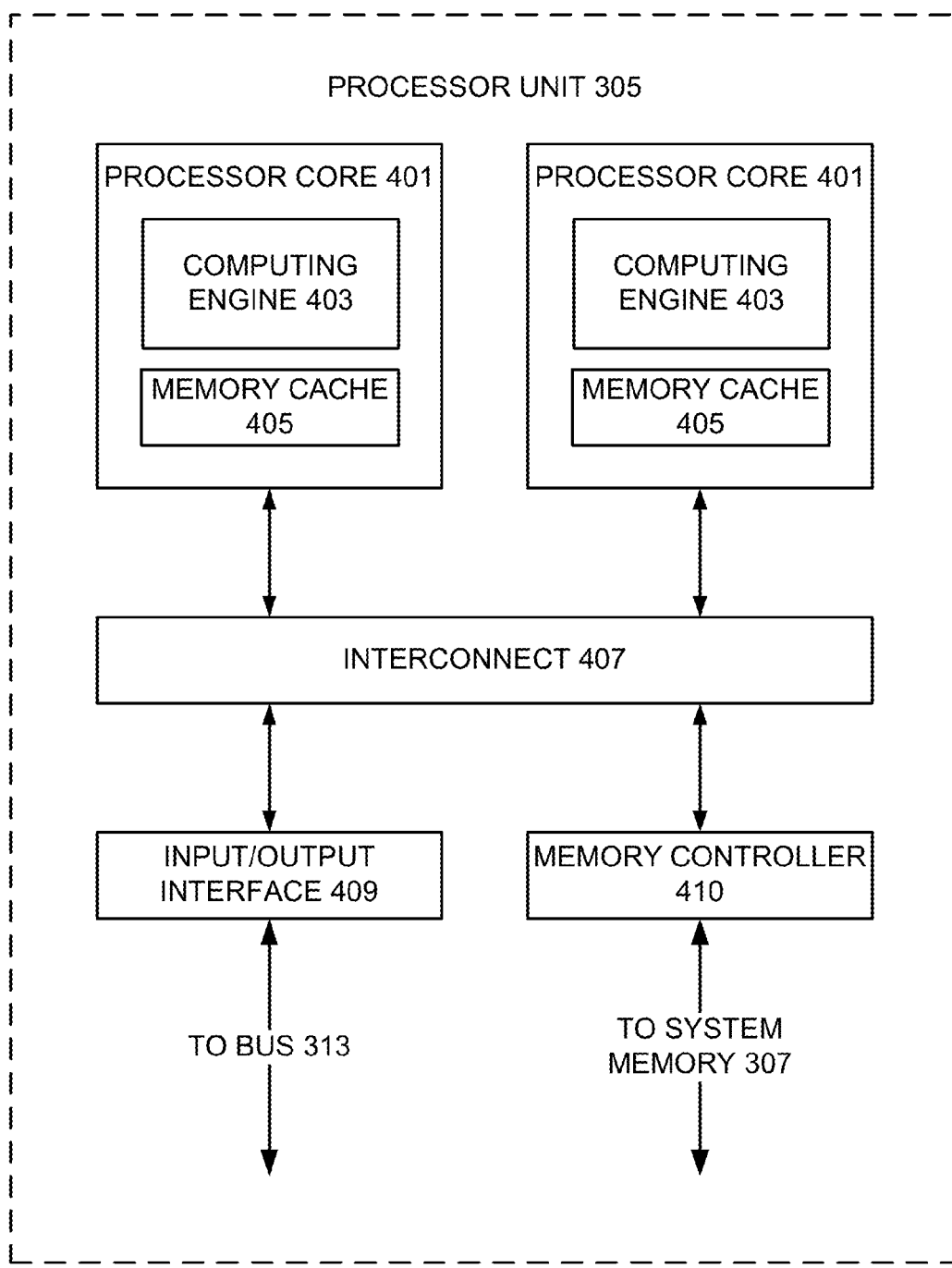

With some implementations of the invention, the processor unit 305 can have more than one processor core. Accordingly, FIG. 4 illustrates an example of a multi-core processor unit 305 that may be employed with various embodiments of the invention. As seen in this figure, the processor unit 305 includes a plurality of processor cores 401. Each processor core 401 includes a computing engine 403 and a memory cache 405. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 403 may then use its corresponding memory cache 405 to quickly store and retrieve data and/or instructions for execution.

Each processor core 401 is connected to an interconnect 407. The particular construction of the interconnect 407 may vary depending upon the architecture of the processor unit 401. With some processor cores 401, such as the Cell microprocessor created by Sony Corporation, Toshiba Corporation and IBM Corporation, the interconnect 407 may be implemented as an interconnect bus. With other processor cores 401, however, such as the Opteron™ and Athlon™ dual-core processors available from Advanced Micro Devices of Sunnyvale, Calif., the interconnect 407 may be implemented as a system request interface device. In any case, the processor cores 401 communicate through the interconnect 407 with an input/output interface 409 and a memory controller 410. The input/output interface 409 provides a communication interface between the processor unit 305 and the bus 313. Similarly, the memory controller 411 controls the exchange of information between the processor unit 305 and the system memory 307. With some implementations of the invention, the processor unit 305 may include additional components, such as a high-level cache memory accessible shared by the processor cores 401.

It also should be appreciated that the description of the computer network illustrated in FIG. 3 and FIG. 4 is provided as an example only, and it not intended to suggest any limitation as to the scope of use or functionality of alternate embodiments of the invention.

System Design Management (SDM) Implementations

FIGS. 5A and 5B illustrate an example implementations of system design management according to various embodiments of the invention. Referring to FIG. 5A, a system design management tool 500 can include a classification unit 502 to generate or modify a framework 501 of a system-level design for an electronic system. As discussed above, the framework 501 of the system-level design, in some embodiments, can describe the electronic system by specifying various features and/or characteristics of the electronic system. For example, the framework 501 of the system-level design can describe the electronic system as a collection of objects, which can be assigned attributes that identify the various features or characteristics associated with the objects. The framework 501 also can utilize the objects to characterize development processes for the electronic system, for example, implement project management functionality, manage user access, permissions, priorities, and administrative review, or the like, which will be described below in greater detail.

The classification unit 502, in some embodiments, can enable development of the framework 501 for the system-level design. For example, the classification unit 502 can generate at least a portion of the framework 501 for the system-level design in response to input from a user interface. The classification unit 502 also can receive the framework 501 for the system-level design from a device or system external to the system design management tool 500.

The system design management tool 500 can include a correlation unit 504 to correlate the framework 501 for the system-level design to design information 503, for example, developed by multiple different design tools. The design information 503 can include at least a portion of a design from one or more different electronic design automation tools or other developmental tool, such as a timekeeper, project management tool, or the like. In some embodiments, the correlation unit 504 can correlate the design information 503 to the framework 501 by associating or linking data from the design information 503 to different objects or attributes in the framework 501.

The correlation unit 504 can correlate the design information 503 to the framework 501 for the system-level design in multiple different ways. For example, the correlation unit 504, in some embodiments, can communicate the framework 501 of the system-level design or a portion thereof to one or more different electronic design automation tools or other developmental tool, which can allow the one or more different electronic design automation tools or other developmental tool to associate portions of the design they have developed or are in the process of developing to the framework 501 received from the correlation unit 504. The one or more different electronic design automation tools or other developmental tool can then communicate the associated portions to the correlation unit 504, where the correlation unit 504 utilizes the associated portions to correlate the designs to the framework 501 for the system-level design. In some embodiments, the correlation unit 504 can receive the design information 503 from the one or more different electronic design automation tools or other developmental tool and correlate the received portions of the designs to the framework 501 for the system-level design, for example, based on which of the one or more different electronic design automation tools or other developmental tool sent the design information 503, the content of the design information 503, or the like.

The system design management tool 500 can include a design analysis unit 506 to determine whether the electronic designs are congruent with the system-level design based, at least in part, on the correlation of the designs to the framework 501 for the system-level design. The design analysis unit 506, in some embodiments, can utilize the structure of the framework 501, such as the object and attributes, and any design information 503 provided to the system design management tool 500 from one or more different electronic design automation tools or other developmental tool to identify whether an individual design conforms with the system-level design, whether multiple different designs are congruent with each other, or the like.

The design analysis unit 506 can output one or more notifications 505, for example, to one or more different electronic design automation tools or other developmental tool. These notifications 505 can inform the tools of congruency or lack thereof between the design information 503 and the framework 501, between design information 503 corresponding to different tools, scheduling or timing related development issues, or the like. In some embodiments, the design analysis unit 506 can utilize developmental progress associated with the designs corresponding to the tools to selectively output one or more notifications 505 to the tools. For example, when one tool has developed a design that conflicts with the framework 501, the design analysis unit 506 can selectively inform other tools of the conflict depending on whether the conflict impacts their corresponding designs.

The system design management tool 500 can include a visualization unit 508 to output a presentation 507 of the system-level design. In some embodiments, the presentation 507 can be one or more graphical views of the system-level design, as structured by the framework 501. The visualization unit 508 can build one or more graphical view of the framework and correlated design information 503, which can illustrate the system-level design of the electronic system based on the framework 501 and correlated design data. There are many different ways to organize the objects in the graphical views, such as by relationships to other objects, by shared attributes among sets or sub-sets of object, by scheduling dependence based on project management work flow, by a total amount of interrelationship to other objects, of the like. In some embodiments, the visualization unit 508 can annotate the presentation 507 with various attributes associated with those objects, including whether design data has been correlated with the objects, types of design data utilized, a status of design work associated with the object, or the like. Embodiments of different types of graphical views will be described below in greater detail.

Referring to FIG. 5B, a distributed server system 510 can include a management server 512 to utilize a framework of a system-level design for an electronic system to enable integration of multiple designs generated by different development tools, such as one or more electronic design automatic tools, project management tools, or the like.

The management server 512 can include a framework unit 511 to generate or modify the framework of the system-level design for the electronic system. As discussed above, the framework of the system-level design, in some embodiments, can describe the electronic system by specifying various features and/or characteristics of the electronic system. For example, the framework of the system-level design can describe the electronic system as a collection of objects, which can be assigned attributes that identify the various features or characteristics associated with the objects. The framework also can utilize the objects to characterize development processes for the electronic system, for example, implement project management functionality, manage user access, permissions, priorities, and administrative review, or the like, which will be described below in greater detail.

The framework unit 511, in some embodiments, can enable development of the framework for the system-level design. For example, the framework unit 511 can generate at least a portion of the framework for the system-level design in response to input from a user interface. The framework unit 511 also can receive the framework for the system-level design from a device or system external to the management server 512.

The management server 512 can receive design information 513, for example, from the different development tools, and correlate the framework for the system-level design to design information 513, for example, developed by multiple different design tools. The design information 513 can include at least a portion of a design from one or more different developmental tools. In some embodiments, the management server 512 can correlate the design information 513 to the framework by associating or linking data from the design information 513 to different objects or attributes in the framework.

The management server 512 can correlate the design information 513 to the framework for the system-level design in multiple different ways. For example, the management server 512, in some embodiments, can communicate the framework of the system-level design or a portion thereof to one or more different developmental tools, which can allow the developmental tools to associate portions of the design they have developed or are in the process of developing to the framework received from the management server 512. The developmental tools can then communicate the associated portions to the management server 512, where the management server 512 utilizes the associated portions to correlate the designs to the framework for the system-level design. In some embodiments, the management server 512 can receive the design information 513 from the developmental tools and correlate the design information 513 to the framework for the system-level design, for example, based on which of the developmental tools sent the design information 513, the content of the design information 513, or the like.

The management server 512 can output a presentation 517 of the system-level design. In some embodiments, the presentation 517 can be one or more graphical views of the system-level design, as structured by the framework. The management server 512 can build one or more graphical view of the framework and correlated design information 513, which can illustrate the system-level design of the electronic system based on the framework and correlated design data. There are many different ways to organize the objects in the graphical views, such as by relationships to other objects, by shared attributes among sets or sub-sets of object, by scheduling dependence based on project management work flow, by a total amount of interrelationship to other objects, of the like. In some embodiments, the management server 512 can annotate the presentation 517 with various attributes associated with those objects, including whether design data has been correlated with the objects, types of design data utilized, a status of design work associated with the object, or the like. Embodiments of different types of graphical views will be described below in greater detail.

In some embodiments, the distributed server system 510 can include an object server 514 to operate in coordination with the management server 512 to store the framework of the system-level design, at least portions of the design information 513, or links to portions of designs developed by one or more of the developmental too in a memory system 518. The memory system 518 can include one or more memory devices to store data for the distributed server system 510.

The distributed server system 510 can include a heartbeat server 516 to operate in coordination with the management server 512 and the object server 514 to determine whether the electronic designs are congruent with the system-level design based, at least in part, on the correlation of the designs to the framework for the system-level design. The heartbeat server 516, in some embodiments, can utilize the structure of the framework, such as the object and attributes, and any design information 513 to identify whether an individual design conforms with the system-level design, whether multiple different designs are congruent with each other, or the like.

The heartbeat server 516 can output one or more notifications 515, for example, to the developmental tools. These notifications 515 can inform the tools of congruency or lack thereof between the design information 513 and the framework, between design information 513 corresponding to different tools, scheduling or timing related development issues, or the like. In some embodiments, the heartbeat server 516 can utilize developmental progress associated with the designs corresponding to the tools to selectively output one or more notifications 515 to the developmental tools. For example, when one developmental tool has developed a design that conflicts with the framework, the heartbeat server 516 can selectively inform other developmental tools of the conflict depending on whether the conflict impacts their corresponding designs.

As the development tools alter or build their corresponding designs, the management server 512 can correlate the altered or new portions of the designs to the framework. The object server 514 can update the memory system 518 with these new correlations between design data and the framework, which can also be communicated to the heartbeat server 516. The heartbeat server 516 can identify the alterations or new portions of the designs, in some embodiments, in real-time, and output notifications 515 to the developmental tools in response to the alterations or new portions of the designs. This real-time functionality can allow the distributed server system 510 to provide up-to-date and synchronized information to the various developmental tools.

Illustrative System Design Management Interface

Figure 7:
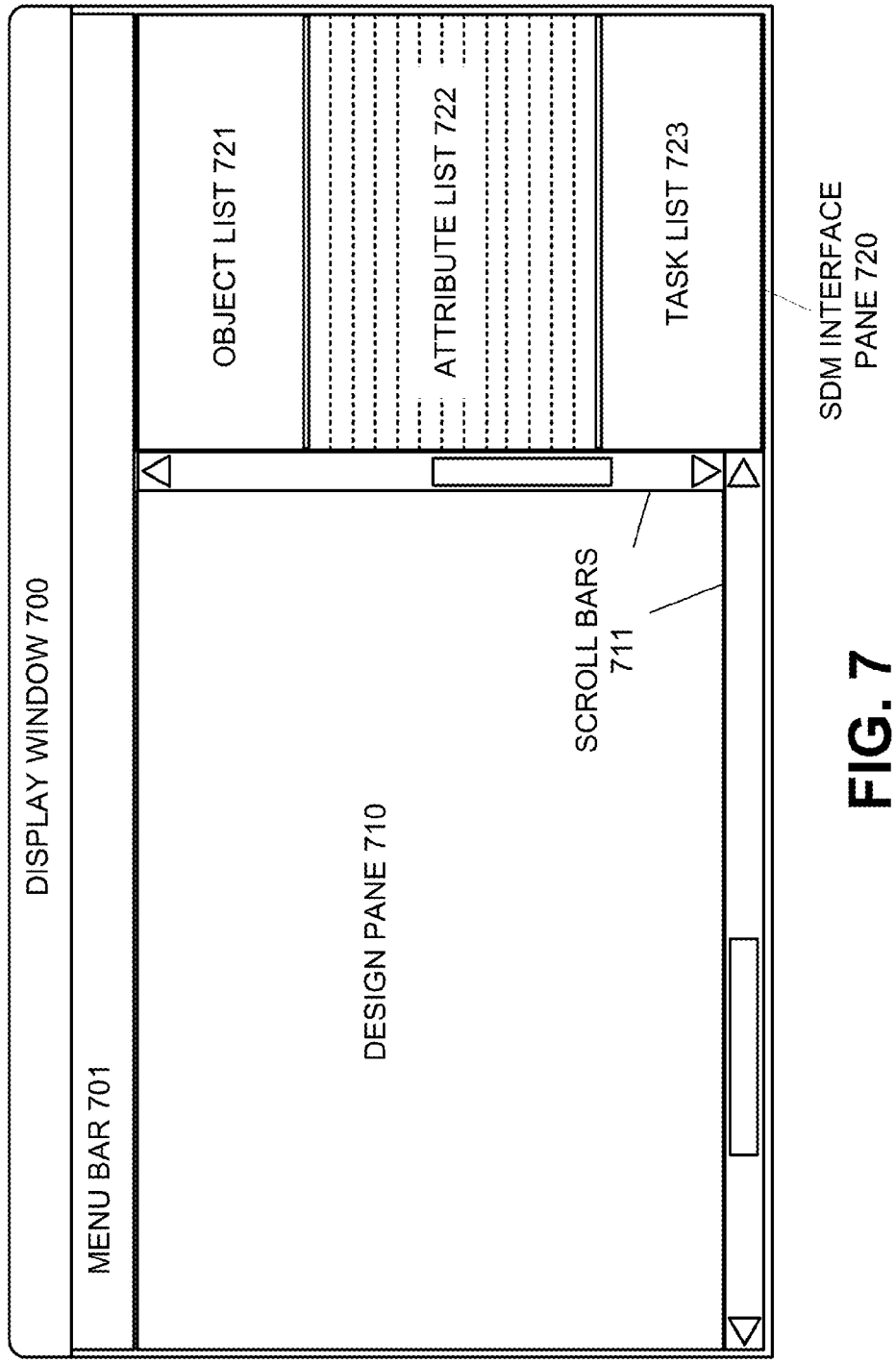
FIG. 7 illustrates an example design tool display window having a system design management interface pane according to various embodiments of the invention.

FIG. 7 illustrates an example design tool display window 700 having a system design management (SDM) interface pane 720 according to various embodiments of the invention. Referring to FIG. 7, the design tool display window 700 can include a design pane 710 to allow for development of a design for at least a portion of an electronic system. The design pane 710 can include scroll bars 711, that, when selected or moved, for example, in response to user input, can adjust which portions of a design are viewable in the design pane 710. The design can correspond to a set of requirements for the electronic system, a functional description or a physical layout of at least a portion of the electronic system, or the like. In some embodiments, the design tool corresponding to the design tool display window 700 also can be an interface for one or more verification tools or systems, a project management tool, or the like.

The design tool display window 700 includes the system design management interface pane 720 to present information from one or more devices external to the design tool associated with the display window 700, such as at least a portion of the framework from the management system, tasks from a project management tool, or the like. The design tool display window 700 can include a menu bar 701 having various mechanisms to selectively sort, filter, organize, populate, or the like, design in the design pane 710 and/or the system design management interface pane 720.

The system design management interface pane 720 can include an object list 721 capable of being populated with names and/or descriptions of objects in a framework of a system-level design for the electronic system. In some embodiments, the system design management interface pane 720 can include all or a subset of the objects in the framework. For example, a system design management interface can selectively filter the objects in the framework prior to presentation in the object list 721 of the system design management interface pane 720. This selective filtering can be based on any number of factors, such as which objects in the framework are relevant to the design tool corresponding to the display window 700, which objects current are not correlated or associated to design data displayable in the design pane 710, or the like.

The system design management interface pane 720 can include an attribute list 722 capable of being populated with names and/or descriptions of attributes in the framework of the system-level design for the electronic system. In some embodiments, the attributes listed in the attribute list 722 can correspond to the attributes associated with one or more objects in the object list 721. For example, in response to a selection of at least one object in the object list 721, the system design management interface pane 720 can populate the attribute list with attributes corresponding to the selected objects.

The system design management interface pane 720 can include a task list 723 capable of being populated with names and/or descriptions of tasks to be performed by one or more users of the design tool corresponding to the display window 700. In some embodiments, these tasks can correspond to developmental activity to be performed with the design tool, such as building or generating a design for at least a portion of the electronic system, or the tasks can correspond to characterization of the design displayable in the design pane 710.

The system design management interface integrated or plugged-in to the design tool corresponding to the display window 700 can associate or link objects or attributes to design data from the design pane 710, in response to user input. For example, when the system design management interface receives a selection of a portion of a design in the design pane 710 and a selection of an attribute or object system design management interface pane 720, the system design management interface can associate the selected portion of the design to the selected attribute and/or object. In some embodiments, the system design management interface also can receive a selection of a task from the task list 723, which can associate the selected task to the selected portion of the design and/or the selected attribute and/or object.

Framework Using Illustrative Meta Model Implementation

Figure 8:
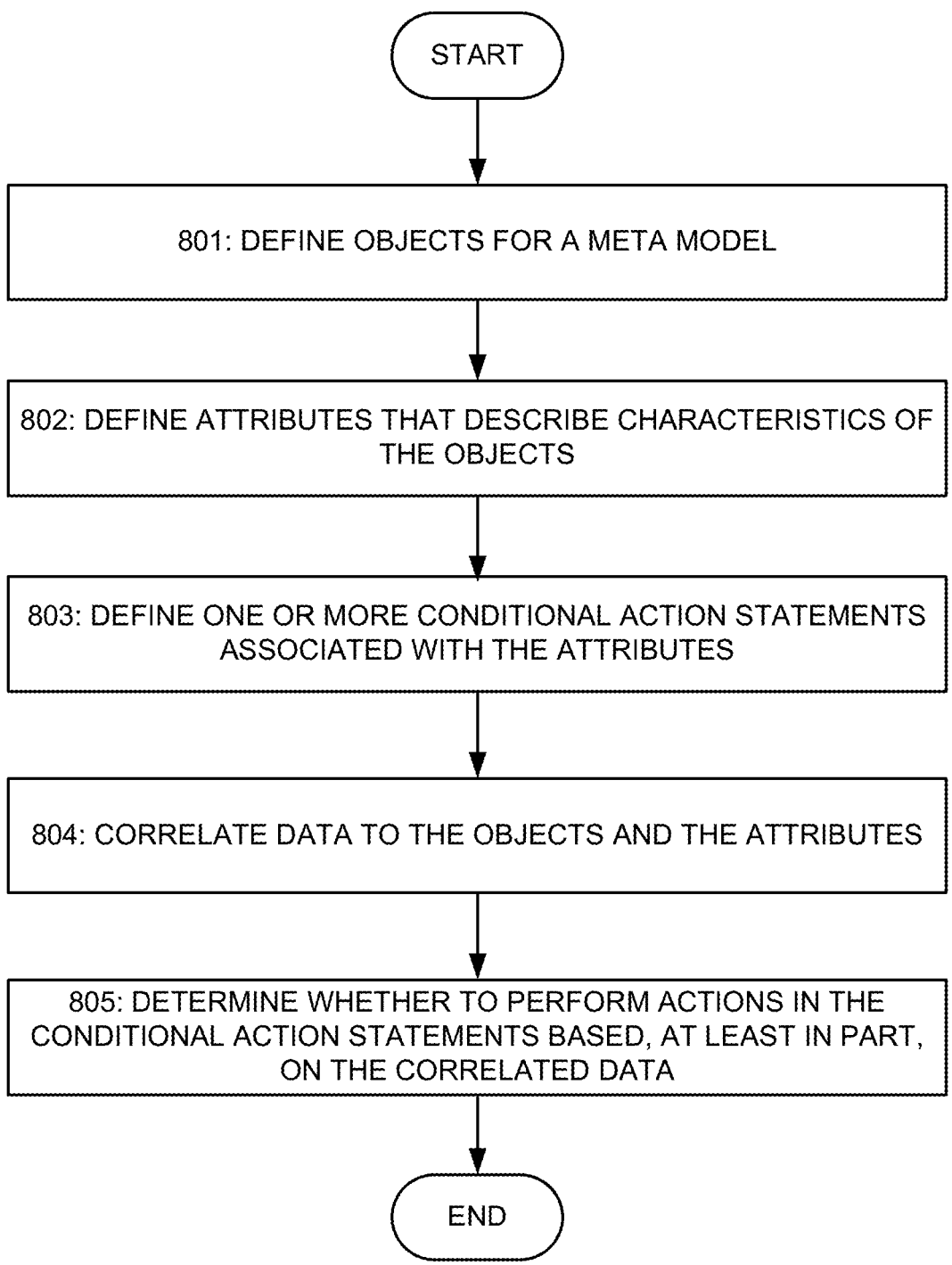
FIG. 8 illustrates an example flowchart for developing a meta model according to various embodiments of the invention.

FIG. 8 illustrates an example flowchart for developing a meta model according to various embodiments of the invention. Referring to FIG. 8, a meta model can be an extensible data structure capable of describing various devices, products, processes, flows, systems, designs, or the like, by their constituent components, portions, features, or the like. The meta model can include multiple objects or artifacts, which can correspond to the components, portions, features, or the like. Each of the objects includes one or more attributes, which can define at least one characteristic of the object. In some embodiments, the attributes can describe physical or functional aspects of the object, describe a relationship to another object, or the like. The objects can be arranged in a flat structure relative to each other or in a hierarchical structure, for example, based on common attributes. This hierarchical structure can allow objects to have attributes defined or assigned to them directly and/or for them to inherit attributes from other (higher-level) objects.

While a particularly defined set of objects and associated attributes can properly characterize an underlying device, product, process, flow, system, design, or the like, the meta model can provide additional functionality, which allows the meta model, when executed by a computing system, to prompt or direct the computing system to perform various operations based on content of data correlated to the objects and/or attributes. For example, the meta model can include conditional action statements, which can be associated with particular objects or attributes. When a computing system correlates data to the objects and the attributes, the conditional action statements can prompt the computing system to compare the correlated data against a condition in the conditional action statement and selectively perform an action, such as a non-congruency notification, based on the comparison. The computing system also can perform other operations based on attributes. For example, when the computing system identifies that multiple objects are related based on an attribute, the computing system can compare correlated data for each of the objects to check for congruency, and then selectively perform an action, such as a non-congruency notification, based on the comparison.

To develop the meta model, a computing system can define objects for the meta model in block 801, define attributes that describe characteristics of the objects in block 802, and define one or more conditional action statements associated with the attributes in block 803. In a block 804, the computing system can correlate data to the objects and possibly the attributes. As discussed above, this correlation can be performed by identifying associations between the data and objects or attributes made in a design tool or by inferring associations between data and objects or attributes based on the source or content of the data. In a block 805, the computing system can determine whether to perform actions in the conditional action statements based, at least in part, on the correlated data.

System-Level Design Visualization

Figure 9:
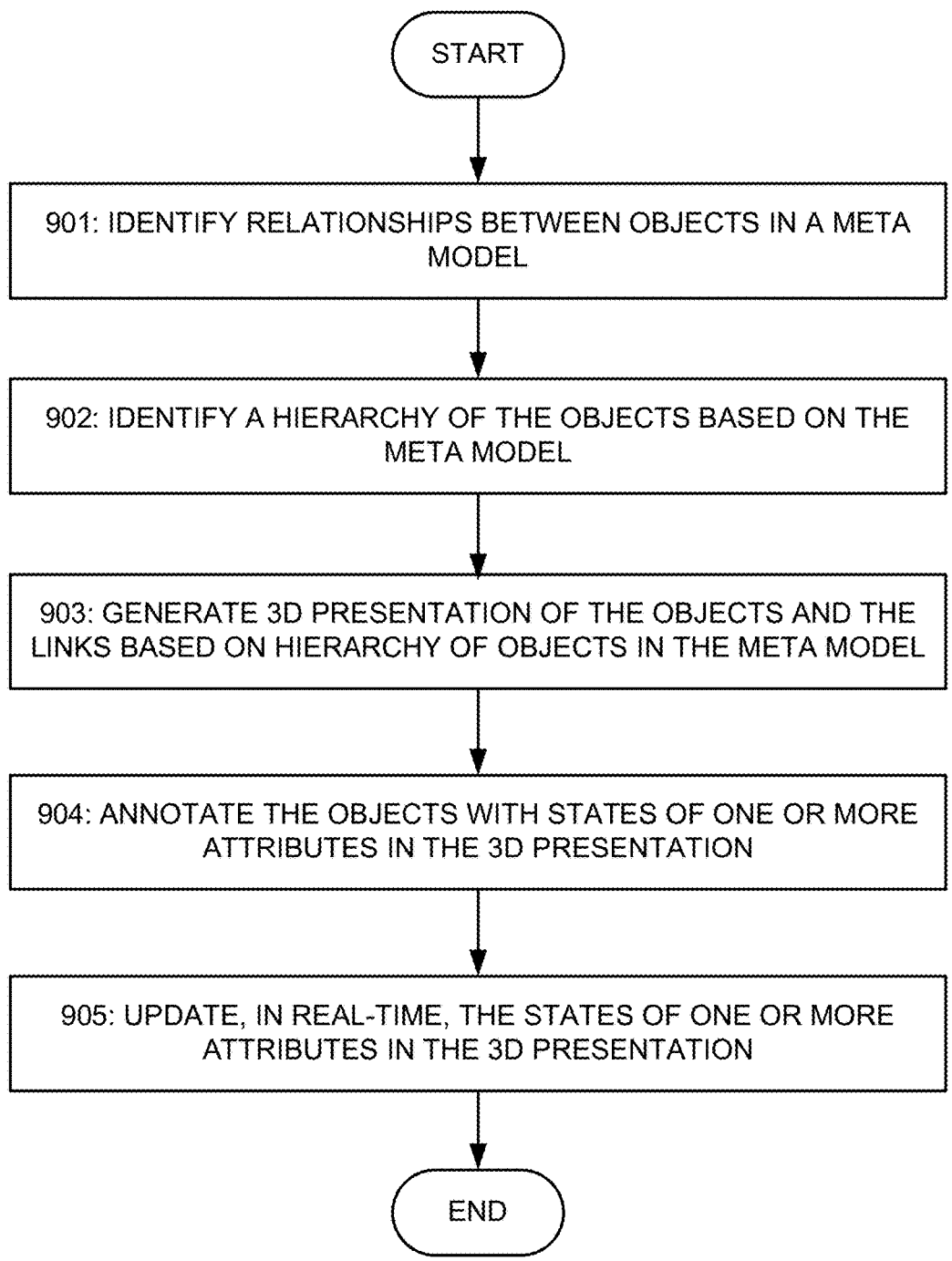
FIG. 9 illustrates an example flowchart for presenting a graphical representation of the meta model according to various embodiments of the invention.

FIG. 9 illustrates an example flowchart for presenting a graphical representation of the meta model according to various embodiments of the invention. Referring to FIG. 9, in a block 901, a computing system can identify relationships between objects in a meta model. In some embodiments, the relationships between objects can be defined expressly by special attributes in related objects.

In a block 902, the computing system can identify a hierarchy of the objects based on the meta model. Since objects in a hierarchical structure can be arranged or organized hierarchically according to their common attributes, the computing system can identify the hierarchy of objects based on their common attributes.

In a block 903, the computing system can generate 3D presentation of the objects and the links based on hierarchy of the objects in the meta model. The 3D presentation, for example, can show all or a subset of the objects in the meta model relative to each other based on their defined relationships with each other as well as their location in the hierarchy of objects. Embodiments of the 3D presentation of the objects and their corresponding links will be shown below in greater detail.

In a block 904, the computing system can annotate the objects with states of one or more attributes in the 3D presentation. For example, the 3D presentation can add a marker to the object to indicate of a state corresponding to a particular attribute. In some embodiments, the marker can indicate whether a particular portion of the meta model has correlated data and/or whether that correlated data corresponds to a completed developmental task. For example, when utilizing a framework to develop a circuit design for an electronic system, the marker can indicate whether a certain portion of the circuit design has been completed by the design engineer.

In some embodiments, the 3D presentation also can include a temporal aspect to the arrangement of the objects, for example, spatially separating objects whose state or status depends a state or status of another object, which can be annunciated by a state or status of an attribute associated with the object. For example, when a project management tool dictates a certain order in which portions of a circuit design are to be developed, the 3D presentation can spatially arrange the objects to annunciate that temporal aspect in the framework.

In a block 905, the computing system can update, in real-time, the states of one or more attributes in the 3D presentation. When the management system implementing the meta model can correlate data to the meta model in real-time, the management system can continually update the 3D presentation as the data is correlated to the meta model. In some embodiments, in response to correlating new data to the meta model, the management system can determine whether the newly correlated data would alter the previously generated 3D presentation and, if so, generate a new 3D presentation with information corresponding to the newly correlated data. This feature can allow for a dynamic view of the state of development of any system or process when utilizing the framework.

Figure 10A:
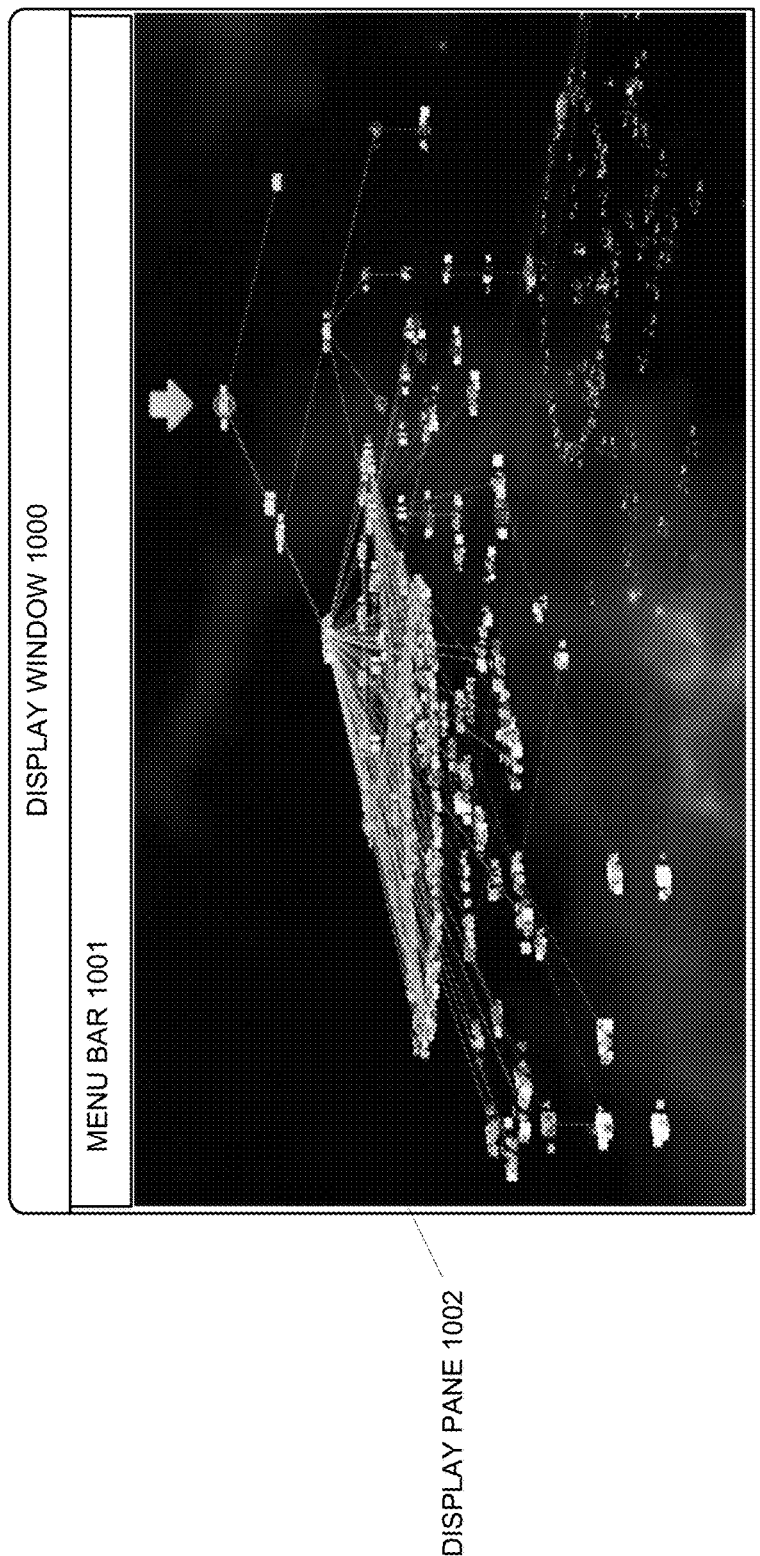
FIGS. 10A and 10B illustrate graphical presentations associated with the meta model according to various embodiments of the invention.
Figure 10B:
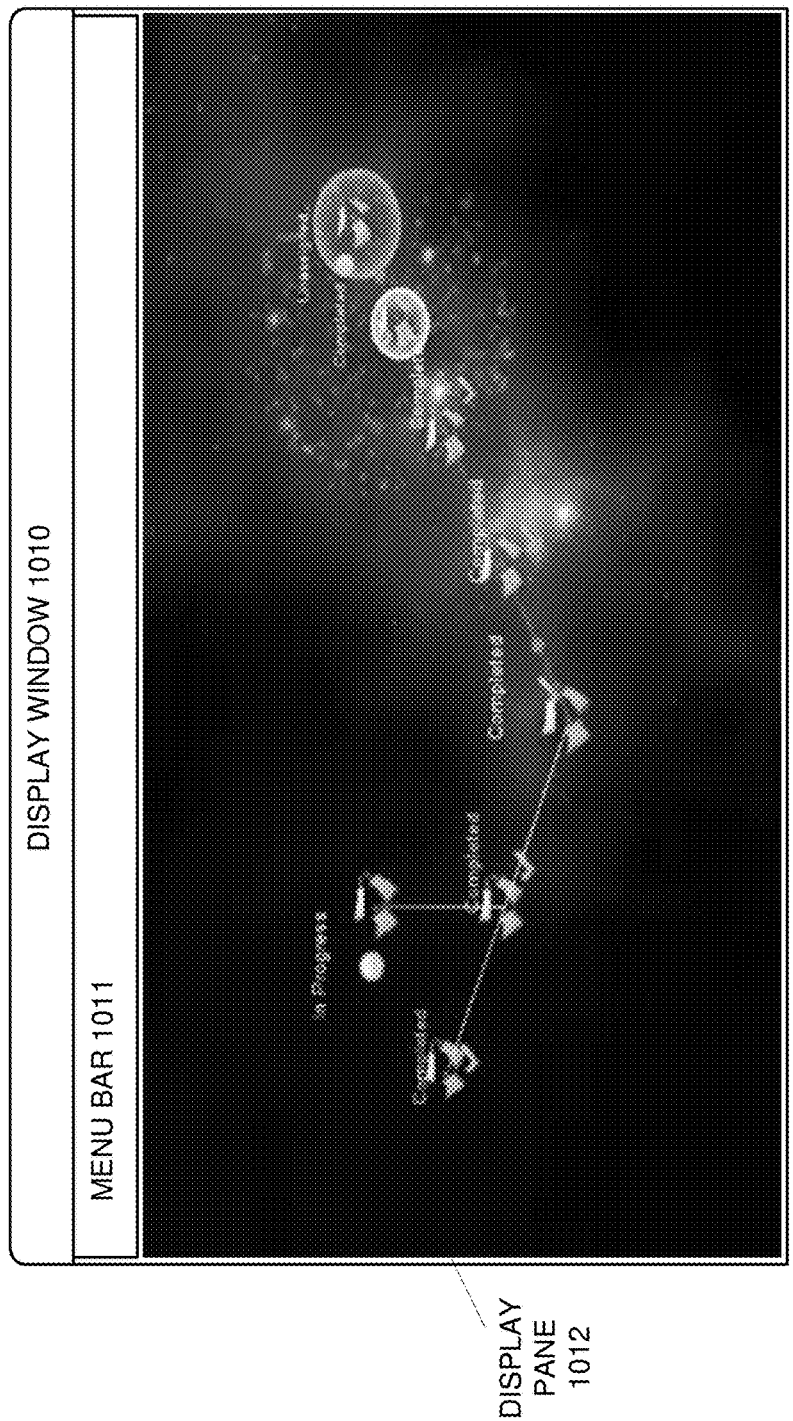

FIGS. 10A and 10B illustrate graphical presentations associated with the meta model according to various embodiments of the invention. Referring to FIG. 10A, a display window 1000 for a visualization tool can include a display pane 1002 capable of displaying a graphical presentation associated with the meta model. In some embodiments, the graphical presentation can be a 3D presentation, which can show objects in the meta model relative to each other. The display window 1000 can include a menu bar 1001 having various mechanisms to selectively sort, filter, organize, populate, manipulate, or the like, graphical in the display pane 1002.

In this instant example, the objects have been arranged in a hierarchical view, which spatially separates the objects according to their interrelationships. As discussed above, these interrelationships can correspond to relationships expressly defined in one or more attributes of the objects or correspond to a parent-child relationship between objects that allows a child object to inherit all of the attributes of the parent object. In some embodiments, the graphical presentation can annotate the objects with various text, markers, shapes, colors, movements, or the like based on the data correlated to the objects or the attributes.

In some embodiments, the visualization tool can selectively filter which objects and associated attributes become displayed in the graphical presentation. This selective filtering can be performed based on the data correlated to the objects and the attributes, based on hierarchical level, for example, removing or displaying objects from the graphical presentation based on their location in the hierarchy, or the like.

Referring to FIG. 10B, a display window 1010 for a visualization tool can include a display pane 1012 capable of displaying a graphical presentation associated with the meta model. In some embodiments, the graphical presentation can be a 3D presentation, which can show objects in the meta model relative to each other. The display window 1010 can include a menu bar 1011 having various mechanisms to selectively sort, filter, organize, populate, manipulate, or the like, graphical in the display pane 1012.

In this instant example, the objects have been arranged in a temporal view, which spatially separates the objects according to their interrelationships and a developmental dependence. As discussed above, these interrelationships can correspond to relationships expressly defined in one or more attributes of the objects or correspond to a parent-child relationship between objects that allows a child object to inherit all of the attributes of the parent object. In some embodiments, the graphical presentation can annotate the objects with various text, markers, shapes, colors, movements, or the like based on the data correlated to the objects or the attributes. The annotation, for example, can identify a status of a task corresponding to an object, which can graphically identify potential delays or bottlenecks in development of a project.

In some embodiments, the objects can be arranged based on their relationships to other objects irrespective of their location in the hierarchy. For example, each object may be spatially located relative to each other based on relationships among the objects. Thus, objects that have strong relationships with other objects would be grouped closer together. This grouping can consider indirect relationships as well as direct relationships. Thus, objects having no relationship with each other can still be grouped closely with each other when they each have a relationship to one or more common object, or a relationship-of-a-relationship.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
generating, by a computing system, a framework for a system-level design of an electronic system, wherein the framework for the system-level design includes a plurality of objects corresponding to a plurality of different portions of the system-level design, and wherein each of the objects is assigned one or more attributes configured to define one or more characteristics for design data expected to be correlated with at least one of the portions of the system-level design;
correlating, by the computing system, a plurality of design components in a plurality of electronic circuit designs generated by a plurality of electronic design automation tools to the objects corresponding to the different portions of the system-level design;
comparing, by the computing system, the design components in the electronic circuit designs to the characteristics for the design data defined by the attributes of the objects correlated to the design components in the electronic circuit designs; and determining, by the computing system, whether the electronic circuit designs are congruent with the system-level design based, at least in part, on the comparison of the design components in the electronic circuit designs to the characteristics for the design data defined by the attributes of the objects in the framework for the system-level design.

2. The method of claim 1 further comprises notifying, by the computing system, one or more of the electronic design automation tools that the electronic circuit designs are incongruent with the system-level design of the electronic system based on a plurality of action instructions defined in the framework for the system-level design of the electronic system.

3. The method of claim 1, wherein determining whether the electronic circuit designs are congruent with the system-level design of the electronic system includes determining whether the electronic circuit designs are congruent with a specification for the electronic system defined by the system-level design or congruent with each other.

4. The method of claim 1, wherein the attributes are configured to identify a relationship between the corresponding objects or actions to perform based on the correlation of the design components in the electronic circuit designs to the objects corresponding to the different portions of the framework for the system-level design.

5. The method of claim 1, wherein determining whether the electronic circuit designs are congruent with the system-level design of the electronic system further comprises:
   identifying which of the electronic circuit designs are correlated to the objects in the framework that are related to each other; and
   comparing the attributes of the related objects to the correlated design components of the electronic circuit designs to determine congruency with the system-level design of the electronic system.

6. The method of claim 1 further comprises generating a graphical presentation configured to depict a structure of the objects in the framework, where the structure of the objects shows inter-relationships between the objects based on the attributes of the objects.

7. A system comprising:
   a memory device configured to store machine-readable instructions; and
   a computing system including one or more processing devices, in response to executing the machine-readable instructions, configured to
      generate a framework for a system-level design of an electronic system, wherein the framework for the system-level design includes a plurality of objects corresponding to a plurality of different portions of the system-level design, and wherein each of the objects is assigned one or more attributes configured to define one or more characteristics for design data expected to be correlated with at least one of the portions of the system-level design;
      correlate a plurality of design components in a plurality of electronic circuit designs generated by a plurality of electronic design automation tools to the objects corresponding to the different portions of the system-level design,
      compare the design components in the electronic circuit designs to the characteristics for the design data defined by the attributes of the objects correlated to the design components in the electronic circuit designs, and
      determine whether the electronic circuit designs are congruent with the system-level design based, at least in part, on the comparison of the design components in the electronic circuit designs to the characteristics for the design data defined by the attributes of the objects in the framework for the system-level design.

8. The system of claim 7, wherein the one or more processing devices, in response to executing the machine-readable instructions, are further configured to notify one or more of the electronic design automation tools based on a plurality of action instructions defined in the framework for the system-level design of the electronic system.

9. The system of claim 7, wherein the one or more processing devices, in response to executing the machine-readable instructions, are further configured to determine whether the electronic circuit designs are congruent with a specification for the electronic system defined by the system-level design or with each other.

10. The system of claim 7, wherein the attributes are configured to identify a relationship between the corresponding objects or actions to perform based on the correlation of the design components in the electronic circuit designs to the objects corresponding to the different portions of the framework for the system-level design.

11. The system of claim 7, wherein the one or more processing devices, in response to executing the machine-readable instructions, are further configured to identify which of the electronic circuit designs are correlated to the objects in the framework that are related to each other, and compare the attributes of the related objects to the correlated design components of the electronic circuit designs to determine congruency with the system-level design of the electronic system.

12. An apparatus comprising at least one computer-readable memory device storing instructions configured to cause one or more processing devices to perform operations comprising:
   generating a framework for a system-level design of an electronic system, wherein the framework for the system-level design includes a plurality of objects corresponding to a plurality of different portions of the system-level design, and wherein each of the objects is assigned one or more attributes configured to define one or more characteristics for design data expected to be correlated with at least one of the portions of the system-level design;
   correlating a plurality of design components in a plurality of electronic circuit designs generated by a plurality of electronic design automation tools to the objects corresponding to the different portions of the system-level design;
   comparing the design components in the electronic circuit designs to the characteristics for the design data defined by the attributes of the objects correlated to the design components in the electronic circuit designs; and
   determining whether the electronic circuit designs are congruent with the system-level design based, at least in part, on the comparison of the design components in the electronic circuit designs to the characteristics for the design data defined by the attributes of the objects in the framework for the system-level design.

13. The apparatus of claim 12, wherein the instructions are configured to cause the one or more processing devices to perform operations further comprising notifying one or more of the electronic design automation tools that the electronic circuit designs are incongruent with the system-level design of the electronic system based on a plurality of action instructions defined in the framework for the system-level design of the electronic system.

14. The apparatus of claim 12, wherein determining whether the electronic circuit designs are congruent with the system-level design of the electronic system includes determining whether the electronic circuit designs are congruent with a specification for the electronic system defined by the system-level design or with each other.

15. The apparatus of claim 12, wherein the attributes are configured to identify a relationship between the corresponding objects or actions to perform based on the correlation of the design components in the electronic circuit designs to the objects corresponding to the different portions of the framework for the system-level design.

16. The apparatus of claim 12, wherein determining whether the electronic circuit designs are congruent with the system-level design of the electronic system further comprises:

identifying which of the electronic circuit designs are correlated to the objects in the framework that are related to each other; and comparing the attributes of the related objects to the correlated design components of the electronic circuit designs to determine congruency with the system-level design of the electronic system.

17. The apparatus of claim 12, wherein the instructions are configured to cause the one or more processing devices to perform operations further comprising generating a graphical presentation configured to depict a structure of the objects in the framework, where the structure of the objects shows inter-relationships between the objects based on the attributes of the objects.

* * * * *